United States Patent [19]
Sawyer

[11] 3,880,748
[45] Apr. 29, 1975

[54] PLATINUM-INDIUM-MOLYBDENUM REFORMING CATALYSTS

[75] Inventor: Willard H. Sawyer, Baton Rouge, La.

[73] Assignee: Exxon Research and Engineering Company, Linden, N.J.

[22] Filed: Dec. 13, 1973

[21] Appl. No.: 424,300

Related U.S. Application Data

[62] Division of Ser. No. 215,170, Jan. 3, 1972, Pat. No. 3,833,516.

[52] U.S. Cl.............. 208/136; 208/138; 252/466 PT
[51] Int. Cl............................................. C10g 35/08
[58] Field of Search...... 252/441, 442, 466 PT, 465; 208/136, 138, 139

[56] References Cited
UNITED STATES PATENTS

| | | | |
|---|---|---|---|
| 2,861,959 | 11/1958 | Thorn et al. | 252/466 PT |
| 2,914,464 | 11/1959 | Burton et al. | 252/466 PT |
| 3,002,919 | 10/1961 | Gladrow et al. | 252/465 |

*Primary Examiner*—Herbert Levine
*Attorney, Agent, or Firm*—Llewellyn A. Proctor

[57] ABSTRACT

Process and composition for improving the octane quality of naphthas. A catalyst comprising a triumvirate of the metals platinum, molybdenum and indium, composited with a porous inorganic oxide base, is found particularly useful in reforming, especially in reforming highly paraffinic naphthas.

5 Claims, 1 Drawing Figure

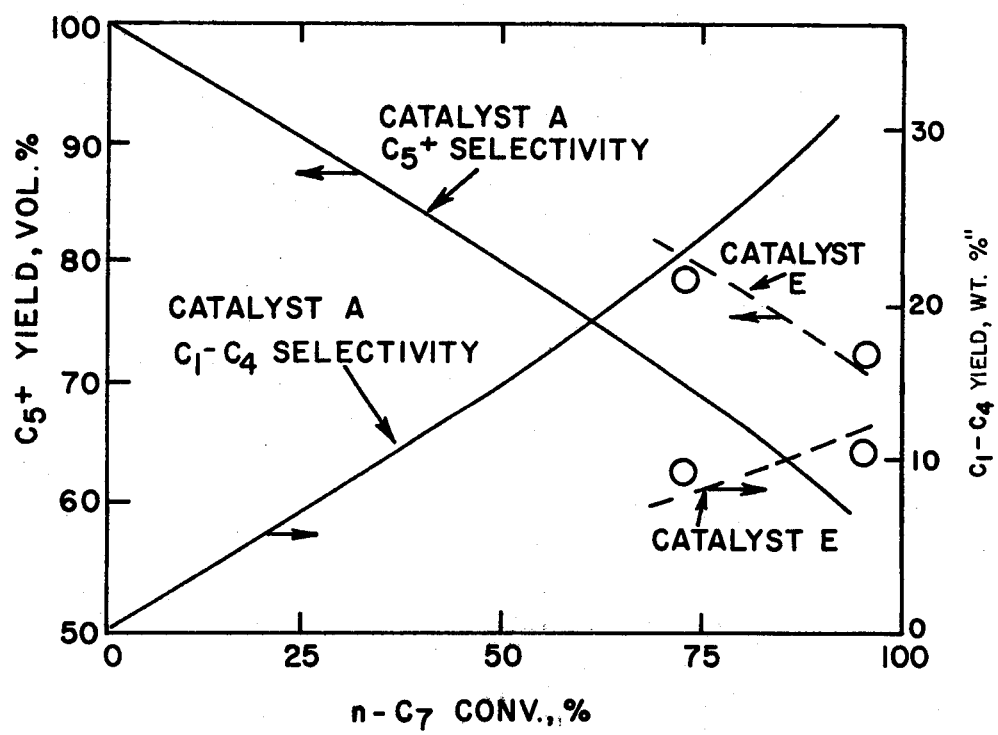
FIGURE

PLATINUM-INDIUM-MOLYBDENUM REFORMING CATALYSTS

This is a division of application Ser. No. 215,170, filed Jan. 3, 1972 now U.S. Pat. No. 3,833,516.

Catalytic reforming, or hydroforming, is a type of process well-known to the petroleum refining industry and has been used for improving the octane quality of naphthas and straight run gasolines for many years. In a typical process, a series of reactors are provided with fixed beds of catalysts, receive downflow feed, and each reactor is preceded by a reheat furnace. A naphtha feed, with hydrogen, is cocurrently passed sequentially through a reheat furnace and then to the preceding reactor of the series. The vapor effluent from the last reactor of the series is a gas rich in hydrogen, which usually contains small amounts of normally gaseous hydrocarbons, and it is separated from the $C_5^+$ liquid product and recycled to the process to inhibit coke formation on the catalyst, though overall there is net hydrogen production.

Reforming catalysts are recognized as dual functional, the catalyst composite including a component comprising a metal, or metals, or a compound or compounds thereof, providing a hydrogenation-dehydrogenation function and an acidic component providing an isomerization function. Early commercially used reforming catalysts have employed molybdenum composited with alumina, molybdenum supplying the hydrogenation-dehydrogenation function of such catalysts. The platinum group or Group VIII noble metals (ruthenium, osmium, rhodium, iridium, palladium and platinum) despite their expense have since been recognized as having a combination of properties which make them particularly suitable as hydrogenation-dehydrogenation components for reforming operations, and hence catalysts utilizing platinum have become widely used in commercial operations. Conventional reforming catalysts have thus long employed platinum composited with an inorganic oxide base, particularly alumina. More recently promoters which include other Group VIII novel metals, e.g., iridium, have been admixed with platinum. Other metals such as rhenium, germanium, tin, Group III and rare earth metals, etc. have been added to platinum to enhance one or more of certain of the characteristics which a good reforming catalyst must possess—viz. activity, selectivity, activity maintenance and yield stability. Minor proportions of a halogen, e.g., chlorine, are generally added to supply the acid function required of such catalysts.

A reforming catalyst must possess sufficient activity to produce aromatics, activity generally being a measure of aromatic production (or octane improvement) as a function of temperature. Reforming catalysts must, in addition to high activity, possess good selectivity which is the ability of the catalyst to produce high yields of high octane number $C_5^+$ liquid products with low production of normally gaseous hydrocarbons, i.e., $C_1$-$C_4$ hydrocarbons, or solid carbonaceous byproducts. Such catalysts possess good stability or activity maintenance, i.e., activity plotted as a function of time, for retention of the properties of good activity and selectivity characteristics for prolonged periods of operation. Stability, or activity maintenance, is thus related to the rate of change of activity.

The principal reactions produced by the dual functional catalysts in reforming are: (1) the dehydrogenation of naphthenes to produce the corresponding aromatics hydrocarbons, e.g., methylcyclohexane is dehydrogenated to form toluene, (2) isomerization of n-paraffins to form branched-chained, paraffins and isomerization of ring compounds, e.g., the isomerization of ethylcyclopentane to form methylcyclohexane, and dehydrogenation of the latter to form toluene, (3) dehydrocyclization of paraffins to form aromatics, e.g., the dehydrocyclization of n-heptane to form toluene, and (4) hydrocracking of high molecular weight feed constituents to form lower molecular weight, or lower boiling constituents, e.g., the cracking of n-decane to produce $C_3$ and $C_7$ hydrocarbons. The net effect of such reactions is to increase the concentration of aromatics, with consequent octane improvement of naphthas boiling within the gasoline range.

The rate of the several reforming reactions described in this complex sequence differ greatly one from another and are not only influenced by process conditions, but by the nature of the catalysts used in the process. In reforming with such catalysts, e.g., halogen containing platinum-on-alumina catalysts, naphthenes are readily and quite rapidly dehydrogenated to produce aromatics. Dehydrocyclization of paraffins to produce aromatics, however, is a difficult reaction to catalyze. In fact, it is the most difficult reaction of the sequence to catalyze. Paraffins, however, are beyond doubt the component of naphtha and gasolines which have the highest octane improvement potential, since paraffins, particularly normal paraffins, are very low on the octane scale. SInce this dehydrocyclization reaction releases considerable hydrogen, it would be favored by low hydrogen partial pressure and low total system pressure. Unfortunately, however, increased severities produced by this expediency also increases the rate of hydrocracking and coke make, the coke depositing on and inactivating the catalyst, and hence such apparent expediency simply cannot be tolerated.

The performance of this dual functional catalyst is thus sensitive to the formation of coke which forms on its surface and shields its active sites from the reactants. Though the catalyst can and usually must be regenerated by means known to the art, frequent regenerations are nonetheless costly in terms of production and maintenance. The problem facing workers in the art, particularly in view of the new drive for higher octane in "low lead" and "no lead" environments is to develop new dual functional catalysts having superior activity, selectivity and stability in reforming. The discovery of catalysts having one or more of these characteristics, however, is not a simple matter and oftimes improvements of one characteristic are offset by adverse effects in another of these characteristics. Thus, a catalyst which possesses good selectivity does not necessarily have good activity, and vice versa. Conversely, one with both high activity and selectivity may be very poor as regards activity maintenance. A proper balance is essential and an improvement gained in one characteristic cannot be too much offset by loss in another characteristic.

The basic purpose of naphtha reforming is, in its very essence, to obtain improved octane number. Octane improvement, however, must be based on a regard to a proper balance between the catalyst characteristics of activity, selectivity and stability. Obtaining high octane number with conventional platinum-on-alumina catalyst, however, has become extremely difficult, supra, and hence there is an acute need in the art for new and improved reforming catalysts.

It is accordingly, a primary objective of the present invention to obviate these and other prior art deficiencies, and to fulfill this need.

A specific object is to provide new and improved reforming catalysts, and to provide a new and improved reforming process utilizing such catalysts.

Accordingly, it has now been discovered that a catalyst composition comprising a triumvirate of the metals platinum, molybdenum and indium composited with an inorganic oxide base is considerably more selective for producing gasolines at reforming conditions than previously used catalysts. A new catalyst composition comprising from about 0.05 to about 2 percent platinum, preferably from about 0.2 to about 0.7 percent platinum, 0.01 to about 2 percent molybdenum (as $MoO_3$), preferably from about 0.5 to about 0.7 percent molybdenum (as $MoO_3$), and from about 0.05 to about 2 percent indium, and preferably from about 0.2 to about 0.7 percent indium, based on the total weight of the catalyst composition, is found particularly suitable for use in reforming paraffin feeds. Such catalysts possess superior selectivity for dehydrocylcization of paraffins, and the cracking activity of such catalysts is drastically decreased as compared with conventional catalysts. Moreover, in the preferred combinations the activity of the catalysts is compared favorably with conventional platinum-on-alumina reforming catalysts.

The catalysts of this invention are particularly suitable for use in multiple stage reforming processes, especially for use in stages subsequent to the initial stage, or stages, wherein the naphthenes of a feed are dehydrogenated. A preferred combination is thus one wherein a conventional catalyst is used to effect dehydrogenation of naphthenes in a first reaction stage, or stages, the paraffins of the feed passing therethrough essentially without reaction, and wherein the paraffins are dehydrocyclized in the subsequent stage, or stages, by contact, at reforming conditions, with the highly selective platinum-molybdenum-indium catalysts. Higher yields of $C_5^+$ liquid products are obtained in such multiple stage reforming process than those wherein the conventional catalyst is used throughout the several stages.

Suitably, in the practice of this invention, the triumvirate of metals are composited with mildly or moderately acidic refractory inorganic oxides which are employed as supports, e.g., silica, silica-alumina, magnesia, thoria, boria, titania, zirconia, various spinels and the like, including in particular alumina which is preferred. High surface area catalysts, or catalysts having surfce areas ranging upwardly from about 100 square meters per gram are preferred. In particular, catalysts having surface areas ranging from about 300 to about 600 square meters per gram prove quite satisfactory.

In formation of the more active catalysts, porous refractory inorganic oxides of desired particle size distribution, in dry state, can be contacted, admixed, or otherwise incorporated with a metal-containing solution, or solutions, and thereby impregnated. The refractory inorganic oxide can thus be pilled, pelleted, beaded, or extruded, alone or admixture with other materials, and dried and crushed to form particles of desired size ranging, e.g., from about 0.1 to about 0.4 inches, and preferably from about 0.2 to about 0.3, diameter. The material can then be treated by contact with a solution containing the desired amounts of platinum, molybdenum and iridium, or treated sequentially by contact with a solution containing one metal and then another in the desired amounts. On the other hand, larger particles can be so treated and then crushed to the desired size. The particulate mass, in either instance, can be dried, calcined, and contacted with hydrogen, in situ or ex situ, to reduce the salt. Suitably, also, the catalyst composite can be formed by adding together suitable reagents such as salts of platinum, molybdenum and iridium, and ammonium hydroxide or ammonium carbonate, and a salt of alumina such as aluminum chloride or aluminum sulfate to form aluminum hydroxide. The aluminum hydroxide containing the salts of platinum, molybdenum and iridium can then be heated, dried, and simultaneously converted to alumina, impregnated with platinum, molybdenum and iridium salts. The material can then be calcined and then hydrogen treated, in situ or ex situ, to reduce the salts and complete the formation of the catalyst composite.

It is often desirable to add halogen, particularly chlorine, to the catalyst composite to control the rate of cracking. Generally, therefore, from about 0.2 to about 1.5 weight percent, and preferably from about 0.5 to about 0.8 percent, based on the weight of the total catalyst composite, are added during manufacture of the catalyst, during regeneration or in situ during normal reforming operations.

Essentially any hydrocarbon fraction containing paraffins, naphthenes, and the like can be converted by means of the catalysts of this invention. A suitable feed, e.g., either virgin or cracked, Fischer-Tropsch or mixtures thereof, is contacted at reforming conditions in the presence of hydrogen (once through, or recycle) with a catalyst composite including a support which contains catalytically active amounts of the triumvirate of metals. Typical feed stream hydrocarbon molecules are those containing from about 5 to about 12 carbon atoms, or more preferably from about 7 to about 9 carbon atoms. Naphthas, or petroleum fractions boiling within the range of from about 80°F. to about 450°F., and preferably from about 125°F. to about 375°F., contain hydrocarbons or carbon numbers within these ranges. Typical fractions thus usually contain from about 20 to about 80 vol. percent of paraffins, both normal and branched, which fall in the range of about $C_5$ to $C_{12}$, from about 20 to about 80 vol. percent of naphthenes boiling within the range of about $C_6$ to $C_{12}$, and about 5 through about 20 vol. percent of the desirable aromatics boiling within the range of about $C_6$ to $C_{12}$.

The reforming reaction is suitably conducted at temperatures ranging from about 600° to about 1050°F., and preferably at temperatures ranging from about 850° to about 1000°F. Pressures range generally from about 50 to about 750 psig., and preferably from about 100 to about 250 psig. The reactions are conducted in the presence of hydrogen to suppress side reactions normally leading to the formation of unsaturated carbonaceous residues, or coke, which causes deactivation of the catalyst. The hydrogen rate, once through or recycle, is generally within the range of from about 1000 to about 10,000 SCF/Bbl, and preferably within the range of from about 2000 to about 5000 SCF/Bbl. The feed stream, in admixture with hydrogen, is passed over the catalyst at space velocities ranging from about 0.1 to about 25 W/W/Hr., and preferably from about 1.0 to about 5.0 W/W/Hr.

The invention will be more fully understood by reference to the following selected non-limiting examples and comparative data which illustrate its more salient features. All parts are given in terms of weight except as otherwise specified.

EXAMPLES 1–4

To provide suitable bases for the catalysts of these examples, particulate alumina, 14 to 35 mesh average particle size (Tyler), of the type conventionally used in manufacturing commercial platinum-on-alumina catalysts is impregnated with various metals for comparative purposes for use in conducting reforming reactions. The several catalysts are formed as follows:

CATALYST A (PLATINUM-ON-ALUMINA)

A portion of the alumina base is slurried in four parts of water. A dilute solution of chloroplatinic acid, with excess hydrochloric acid, is then added and the resultant solution stirred for one hour to assure impregnation. The solids are then separated from the solution by filtration, and then dried in a circulating air oven at about 220°F. The catalyst, which contains 0.3 wt. percent platinum and 0.6 wt. percent chlorine, is dried for a twelve hour period in a flowing stream of hydrogen at 950°F. and at atmospheric pressure.

CATALYST B (MOLYBDENUM AND INDIUM ON ALUMINA)

One hundred grams of a portion of the alumina base is calcined at 1200°F. for 16 hours and then impregnated by contact with 100 cc. of a solution containing 0.62 grams of $(NH_4)_6Mo_7O_{24}.4H_2O$. An additional 20 cc. of $H_2O$ is added. The catalyst is then dried at ambient temperature and then dried overnight in vacuum at 250°F. 0.92 grams of $InCl_3$ is then dissolved in 15 cc. of concentrated HCl and 50 cc. of $H_2O$, the solution having been heated to 200°F. to dissolve the solid. Additional water is then added to make 100 cc. of solution. The impregnation step is repeated using this solution. The impregnated alumina is again dried at 250°F. in a vacuum oven, and the catalyst calcined at 1000°F. for 16 hrs. This catalyst composition is found to be 0.5 $MoO_3$–0.5 percent In.

CATALYST C (MOLYBDENUM AND INDIUM ON ALUMINA)

A procedure identical to that used in the preparation of Catalyst B is used except 14.77 grams of $(NH_4)_6Mo_7O_{24}.4H_2O$ is used. This catalyst composition analyzes a 12 $MoO_3$–0.5 percent In.

CATALYST D (PLATINUM-INDIUM-MOLYBDENUM-ON-ALUMINA CATALYST)

A procedure identical to that used in the preparation of Catalyst A is initially followed, and then molybdenum and indium are combined with the base as described with reference to the preparation of Catalysts B and C. The composition of this catalyst analyzes 0.3 percent Pt–0.5 percent In–0.5 percent $MoO_3$.

Portions of each of Catalysts A, B, C and D, respectively, are charged to a downflow reactor to provide a fixed bed. An n-heptane (n-$C_7$) feed (5 percent) is vaporized in hydrogen (95 percent) at 650°F. and then contacted at 920°–925°F., at atmospheric pressure, with the respective catalyst while the space velocity in W/Hr./W of the n-heptane is varied from 1.1 to 5.6 to obtain a broad range of selectivity-conversion data. The products of the several reactions, respectively, are withdrawn from the reaction and analyzed by gas chromatography. The data from the individual runs, showing only the optimum data points for Catalysts B, C and D, are as given in the table below:

TABLE I n-$C_7$ Reforming
Atmos. Press.
ca. 18 Mol $H_2$/Mol n-$C_7$

| Catalyst | Catalyst A 0.3% Pt on $Al_2O_3$ | | | |
|---|---|---|---|---|
| W/Hr./W | 1.1 | 2.8 | 5.6 | 1.4 |
| Time on Oil, Min. | 90 | ca. 160 | ca. 190 | ca. 330 |
| Temp., °F. | 920 | 925 | 925 | 920 |
| $C_1$-$C_4$, Wt. % | 32.6 | 24.1 | 14.7 | 26.0 |
| $C_5^+$ Yield, Vol. % | 58.0 | 67.7 | 81.4 | 65.9 |
| Toluene in $C_5^+$, Wt. % | 61.5 | 44.7 | 15.1 | 45.2 |
| Conv., Wt. % | 94.9 | 78.7 | 39.7 | 83.0 |
| K, 1/Hr. | 3.3 | 4.3 | 2.8 | 2.5 |

| | Catalyst B | Catalyst C | Catalyst D |
|---|---|---|---|
| Catalyst | 0.5% $MoO_3$/ 0.5% In | 12% $MoO_3$/ 0.5% In | 0.5% $MoO_3$/0.5% In/ 0.3% Pt |
| W/Hr./W | 1.3 | 1.4 | 1.4 |
| Time on Oil, Min. | 60 | 61 | 30 |
| Temp., °F. | 920 | 915 | 930 |
| $C_1$-$C_4$, Wt. % | 1.3 | 18.4 | 8.4 |
| $C_5^+$ Yield, Vol. % | 98.6 | 79.7 | 85.7 |
| Toluene in $C_5^+$, Wt. % | 0.3 | 8.4 | 23.0 |
| Conv., Wt. % | 2.4 | 32.7 | 43.5 |
| K, 1/Hr. | 0.03 | 0.6 | 0.8 |

These data show that the catalyst of this invention (Catalyst D) produces 3–6 Vol. percent more $C_5^+$ liquid products with 4–6 wt. percent less $C_1$-$C_4$ gaseous products than the standard commercial catalyst (Catalyst A). It also produces more aromatics, i.e., toluene, at similar conversion levels. Catalyst B, on the other hand, shows essentially no reforming activity. Catalyst C, which contains double the amount of molybdenum of Catalyst B, is considerably less selective and less active than Catalyst A, the standard commercial reforming catalyst.

The superiority of the catalyst over prior art catalysts is further demonstrated by the following examples.

EXAMPLES 6–7

CATALYST E
(PLATINUM-INDIUM-MOLYBDENUM-ON-ALUMINA CATALYST)

A procedure identical to that used in the preparation of Catalyst D is followed except the composition of the catalyst analyzes 0.3 percent Pt-0.5 percent In-0.05 percent $MoO_3$.

CATALYST F
(PLATINUM-INDIUM-ON-ALUMINA CATALYST)

A procedure identical to that used in the preparation of Catalyst A is initially followed, and the indium is combined with the base as described with reference to the preparation of Catalyst B. The composition of this catalyst analyzes 0.3 percent Pt-0.5 percent In.

Portions of each of catalysts E and F, respectively, are tested in the manner previously described. The data from the individual runs are as given in the table below:

TABLE II

| Catalyst | n-$C_7$ Reforming Atmos. Press. ca. 18 Mol $H_2$/Mol n-$C_7$ Catalyst E | | Catalyst F |
|---|---|---|---|
| Temp., °F. | 935 | 920 | 930 |
| $C_1$-$C_4$, Wt. % | 9.9 | 10.1 | 13.8 |
| $C_5^+$ Yield, Vol. % | 78.4 | 72.3 | 70.4 |
| Toluene in $C_5^+$, Wt. % | 51.4 | 83.5 | 77.0 |
| Conv., Wt. % | 70.6 | 95.6 | 93.3 |

The selectivity data of Catalysts A and E, plotted in the attached FIGURE, thus show that Catalyst E (Pt-In-$MoO_3$ on alumina) is far superior to Catalyst A, the commercially used platinum-on-aluminum catalyst. Catalyst E produces 10-14 vol. percent more $C_5^+$ liquid than that obtained with Catalyst A at similar conversion levels. Further, Catalyst E produces 14–22 wt. percent less $C_1$-$C_4$ cracked products than that obtained with Catalyst A, again at similar conversion levels. As with Catalyst D, Catalyst E produces significantly more toluene than Catalyst A. The dehydrocyclization selectivity of Catalyst E, showing highly superior selectivity for reforming paraffinic feeds to produce high yields of high octane $C_5^+$ gasoline, is outstanding.

The outstanding advantage of the catalyst containing the triumvirate of metals vis-a-vis a platinum-indium catalyst is also shown by comparing the data of Table II, as regards Catalyst E and Catalyst F. The data thus show that catalyst E, at similar conversion levels, produces at least 2 vol. percent greater yields of $C_5^+$ gasoline, 4 wt. percent less $C_1$-$C_4$ cracked products, and considerably more toluene at approximately the same conversion level.

It is apparent to those skilled in the reforming art that the low pressures described in the examples are of very high severity, and that the catalysts of this invention can operate even more successfully at higher pressures, as is preferred for commercial operations.

It is also apparent that these examples demonstrate the very desirable utility of reforming highly paraffinic feeds, as contrasted with naphthenic feeds, and hence that naphthenic feeds, or mixtures of naphthenic feeds can be processed even more successfully. Thus, a very practical embodiment is one wherein the present catalysts are used in a reactor downstream of another which employs the same or a different catalyst for the more simple conversion of naphthenes to aromatics.

It is essential that the catalyst of this invention contain the triumvirate of metals — viz. platinum, indium and molybdenum — deposited or otherwise incorporated upon the porous inorganic oxide bases in catalytically active concentration. The catalytically active metals can be present, e.g., as metallic metal, or as oxides or sulfides of the metal. Under the conditions of forming the catalysts it is likely that the molybdenum is present as $MoO_3$, and such basis has been used in calculating the amount of molybdenum used in formation of the catalysts. The platinum and indium are calculated on the basis of metallic metal. The catalytically active metals are composited with the porous inorganic oxide bases by methods known to the art. Typically, e.g., after impregnation of the base by contact with an aqueous solution of the salt, or salts, the so-formed composite is dried at conditions ranging from about 200° to about 400°F., then calcined at temperatures ranging up to about 1200°F., perhaps sulfided, as desired, and then contacted in situ or ex situ with hydrogen. Halogen, preferably chlorine, and next in preference fluorine, is generally added at the time of catalyst preparation. Additional halogen can be added after regeneration to maintain desired operating levels.

It is apparent that various modifications and changes can be made without departing the spirit and scope of the present invention, an outstanding feature of which is that the octane quality of various hydrocarbon feedstocks, particularly paraffinic feedstocks, can be upgraded and improved.

Having described the invention, what is claimed is:

1. A process for improving the octane quality of naphthas, particularly paraffinic naphthas, by contacting said naphtha at reforming conditions with a catalyst composite consisting essentially of a porous inorganic oxide support, platinum in concentration ranging from about 0.05 to about 2 percent, molybdenum as molybdic oxide in concentation ranging from about 0.01 to about 2 percent, and indium in concentration ranging from about 0.05 to about 2 percent, based on the total weight of the catalyst.

2. The process of claim 1 wherein the catalyst composite contains from about 0.2 to about 0.7 percent platinum, from about 0.05 to about 0.7 percent molybdenum as molybdic oxide, and from about 0.2 to about 0.7 percent indium.

3. The process of claim 1 wherein the porous inorganic oxide support is alumina.

4. The process of claim 1 wherein reforming is conducted at temperatures ranging from about 600°F. to about 1050°F., at pressures ranging from about 50 psig to about 750 psig, at space velocities ranging from about 0.1 to about 25 W/Hr./W, and at hydrogen rates ranging from about 1000 to about 10,000 SCF/Bbl.

5. The process of claim 4 wherein temperatures range from about 850°F. to about 1000°F., pressures range from about 100 psig to about 250 psig, space velocities range from about 1.0 to about 5.0 W/W/Hr., and the hydrogen rate ranges from about 2000 to about 5000 SCF/Bbl.

* * * * *